United States Patent
Mueller et al.

(10) Patent No.: US 9,475,406 B2
(45) Date of Patent: Oct. 25, 2016

(54) LOCKING DEVICE AND VEHICLE SEAT (75) Inventors: Peter Mueller, Mackenbach (DE);
Volker Windecker, Sippersfeld (DE);
Stefan Haber, Pirmasens (DE); Kadir Yasaroglu, Mudanya/Bursa (TR); Silke Labuk, Weilerbach (DE)

(73) Assignee: KEIPER GMBH & CO. KG, Kaiserslautern (DE)

(*) Notice: Subject to any disclaimer, the term of this patent is extended or adjusted under 35 U.S.C. 154(b) by 125 days.

(21) Appl. No.: 14/112,226

(22) PCT Filed: Apr. 16, 2012

(86) PCT No.: PCT/EP2012/001625
§ 371 (c)(1),
(2), (4) Date: Dec. 27, 2013

(87) PCT Pub. No.: WO2012/152361
PCT Pub. Date: Nov. 15, 2012

(65) Prior Publication Data
US 2015/0041611 A1    Feb. 12, 2015

(30) Foreign Application Priority Data

May 6, 2011  (DE) .......................  10 2011 101 285

(51) Int. Cl.
*B60N 2/44*    (2006.01)
*B60N 2/015*   (2006.01)
*B60N 2/36*    (2006.01)

(52) U.S. Cl.
CPC ....... *B60N 2/01516* (2013.01); *B60N 2/01583* (2013.01); *B60N 2/366* (2013.01); *B60N 2/442* (2013.01)

(58) Field of Classification Search
CPC .. B60N 2/442; B60N 2/366; B60N 2/01583; B60N 2/01516
See application file for complete search history.

(56) References Cited

U.S. PATENT DOCUMENTS 5,730,480 A *  3/1998  Takamura ................. 248/503.1
6,945,585 B1 *  9/2005  Liu et al. ................... 296/65.03
(Continued)

FOREIGN PATENT DOCUMENTS

CA          2296504 A1 *  1/1999
CN    KR 101170319 B1 *  1/2012
(Continued)

OTHER PUBLICATIONS

International Search Report mailed Jul. 10, 2012 as received in corresponding International Application No. PCT/EP2012/001625.
(Continued)

*Primary Examiner* — Jeanette E Chapman
(74) *Attorney, Agent, or Firm* — Foley & Lardner LLP (57) ABSTRACT A locking device for a vehicle seat has a catch which is mounted such that it can be pivoted about a second axis and is intended for locking a mating element, and has a clamping eccentric which is mounted such that it can be pivoted about a first axis, between a locking position and an unlocking position and secures a locked state of the catch by interaction with a first functional surface of the catch. In the locked state, the clamping eccentric acts on the first functional surface via a clamping surface. An unlocking element is mounted such that it can be pivoted about the second axis by an actuating device, counter to a spring force, out of a locking position into an unlocking position. The unlocking element and the clamping eccentric have arranged between them a bias spring element.

11 Claims, 6 Drawing Sheets

(56) References Cited

U.S. PATENT DOCUMENTS

| | | | |
|---|---|---|---|
| 7,357,436 B2* | 4/2008 | Willing et al. | 296/65.03 |
| 2003/0042780 A1* | 3/2003 | Klein et al. | 297/367 |
| 2004/0007882 A1 | 1/2004 | Arabia, Jr. et al. | |
| 2006/0082204 A1* | 4/2006 | Zhang | 297/366 |
| 2007/0052255 A1* | 3/2007 | O'Connor | 296/65.03 |
| 2007/0057555 A1* | 3/2007 | Woods et al. | 297/336 |
| 2007/0222250 A1* | 9/2007 | Miller et al. | 296/65.03 |
| 2010/0102614 A1 | 4/2010 | Kreuels et al. | |
| 2010/0270455 A1* | 10/2010 | Obrecht | 248/503.1 |
| 2014/0306507 A1* | 10/2014 | Mueller et al. | 297/463.1 |
| 2014/0348578 A1* | 11/2014 | Mueller et al. | 403/322.4 |

FOREIGN PATENT DOCUMENTS

| | | |
|---|---|---|
| DE | 103 32 912 B3 | 3/2005 |
| DE | 10 2004 021 516 A1 | 11/2005 |
| DE | 10 2006 058 891 A1 * | 6/2008 |
| DE | 10 2007 016 409 A1 | 10/2008 |
| DE | 10 2011 101 283 B3 * | 9/2012 |
| EP | 2 141 312 A1 | 1/2010 |
| JP | 2001-047909 A | 2/2001 |
| JP | 2008-114690 A | 5/2008 |
| JP | 2010-522660 A | 7/2010 |
| WO | WO 2004069585 A1 * | 8/2004 |
| WO | WO 2011123127 A1 * | 10/2011 |
| WO | WO 2012047606 A2 * | 4/2012 |

OTHER PUBLICATIONS

Korean Office Action issued in co-pending Korean Application No. 10-2013-7032362 mailed Jan. 23, 2015, with English translation.

* cited by examiner

LOCKING DEVICE AND VEHICLE SEAT

CROSS REFERENCE TO RELATED APPLICATIONS

The present application is a U.S. National Stage of International Application No. PCT/EP2012/001625, filed on Apr. 16, 2012, which claims the benefit of German Patent Application No. 10 2011 101 285.4, filed on May 6, 2011, the entire disclosures of all of which are incorporated herein by reference.

The invention relates to a locking device for a vehicle seat having the features of the preamble of claim 1. The invention also relates to a vehicle seat having the features of claim 11.

PRIOR ART

One possibility for using locking devices of this type consists in serving to attach a vehicle seat to the floor in a motor vehicle.

In the locked state, the clamping eccentric exerts a closing moment on the pawl via the clamping face.

DE 10 2007 016 409 A1 has disclosed a locking device of this type for a vehicle seat, which locking device comprises a pawl and a clamping eccentric.

US 2004/0 007 882 A1 discloses a locking device for a vehicle seat having a prestressed compression spring which acts with one end on an arm of the clamping eccentric and supports it in its locked position in a spring-loading manner.

DE 103 32 912 B3 shows a locking device known which has a separate unlocking element which acts on the clamping eccentric in order to unlock the locking device.

OBJECT

It is an object of the invention to provide a locking device of the type mentioned at the outset, which locking device requires a small amount of installation space and has a low weight.

Solution

According to the invention, this object is achieved by virtue of the fact that an unlocking element is mounted such that it can be pivoted about the second axis by an actuating device counter to a spring force from a locked condition into an unlocked condition, by way of which unlocking element the clamping eccentric can be driven directly or indirectly such that it can be pivoted from its locked location in the direction of its unlocked location, a prestressed spring element being arranged between the unlocking element and the clamping eccentric, by way of which spring element the unlocking element is spring-loaded into its locked position and the clamping eccentric is spring-loaded into its locked position.

As a result of this configuration, only a spring element has to be actuated in order to unlock the locking device, with the result that only a lower actuating moment is also required.

In the case of an actuating moment which is identical to conventional locking devices, said spring element can be of more powerful configuration, with the result that higher restoring forces are also possible, in order to reliably press back the actuating device, for example, which can have a Bowden cable.

In particular, the reduction of the components leads to a smaller overall size and therefore to a smaller required amount of installation space and a lower weight.

The prestressed spring element can be a tension spring which acts with its one end at a radial spacing from the second axis on the unlocking element and acts with its other end at a radial spacing from the first axis on the clamping eccentric.

However, it is also possible that the prestressed spring element is a compression spring which acts with its one end at a radial spacing from the second axis on the unlocking element and acts with its other end at a radial spacing from the first axis on the clamping eccentric.

On account of a corresponding installation position, the pawl can be capable of being moved by gravity into its unlocked location after a movement of the clamping eccentric into its unlocked position.

In order for it to be possible to ensure this movement even in the case of an installation position of the pawl which is unfavorable for this purpose, a prestressed pawl compression spring can be supported with its one end on an arm of the clamping eccentric so as to load the latter into its locked location and can load the pawl in the unlocking direction with its other end.

As an alternative to this, however, a prestressed spring can also be arranged between the pawl and a stationary component, such as a housing.

If a catching eccentric is mounted such that it can be pivoted about the first axis and ensures a locked state of the pawl by way of interaction with the first functional face of the pawl, it being possible for the pawl to be supported in the locked state by a catching face of the catching eccentric, and it being possible for the catching eccentric to be moved between its locked position and its unlocked position by way of the unlocking element which can be pivoted about the second axis, the catching eccentric supports, by way of the catching face, the pawl on its first functional face in the case of a crash when the locking device is locked.

An unlocking slave can be mounted such that it can be pivoted about the first axis from a locked position into an unlocked position and can be coupled via a driving coupling to the unlocking element in such a way that the unlocking master can be driven such that it can be moved from its locked condition into its unlocked condition, or from its unlocked condition into its locked condition, by way of a pivoting movement of the unlocking element from the locked condition into the unlocked condition, or by way of a pivoting movement of the unlocking element from the unlocked condition into the locked condition.

Here, the unlocking element can serve as signal transducer for indicating the locking state of the locking device.

However, it is also possible that the unlocking element can be pivoted from its locked condition into its unlocked condition by a further actuating device, and the unlocking slave can be driven by the driving coupling such that it can be moved from its locked condition into its unlocked condition or from its unlocked condition into its locked condition in the case of a pivoting movement of the unlocking element from the locked condition into the unlocked condition or in the case of a pivoting movement of the unlocking element from the unlocked condition into the locked condition.

There are therefore two points of action for actuating devices, namely the unlocking slave and the unlocking element, which makes a variable actuating attachment possible.

It is therefore also possible to arrange the actuating devices at different points in the vehicle and to actuate the locking device from each actuating device. Here, one actuating device can be arranged in the passenger compartment and the other actuating device can be arranged in the trunk.

A Bowden cable, an electric drive or a drive of another type can act in each case on the unlocking element and/or the unlocking slave for direct actuation or for remote actuation.

If the clamping eccentric is mounted on the first axis such that it can be pivoted between the catching eccentric and the unlocking slave, and if the unlocking slave has a driver which extends parallel to the first axis, engages into a driving recess of the catching eccentric, and by way of which the clamping eccentric can be driven such that it can be pivoted in the direction of its unlocked location, the catching eccentric is driven in both pivoting directions by the unlocking slave with a compact construction, whereas the clamping eccentric is driven by the unlocking slave only in the direction of its unlocked location.

Here, in a simple construction which compensates for radial tolerances of the driver, the driving recess can be a driving fork.

It goes without saying that other suitable coupling variants can also be used.

The object is also achieved by a vehicle seat having the features of claim 11.

FIGURES AND EMBODIMENTS OF THE INVENTION

In the following text, the invention is explained in greater detail using advantageous exemplary embodiments which are shown in the drawings. However, the invention is not restricted to said exemplary embodiments. In the drawings.

The locking device which is shown is arranged in a floor region of a vehicle seat and has a cup-like housing 1, in which a first axle pin 2 and a second axle pin 3 are arranged fixedly parallel to one another so as to extend transversely with respect to the floor 4 of the housing 1.

An unlocking slave 5, a clamping eccentric 6 and a catching eccentric 7 are mounted on the first axle pin 2 such that they can be pivoted about a first axis 2'.

An unlocking element 8 and a pawl 9 are mounted on the second axle pin 3 such that they can be pivoted about a second axis 3', a cover 10 being clipped onto the pawl 9.

Via a first coupling plate 11, an adapter plate 12 bears against the housing 1 so as to extend transversely over the opening of the housing.

The first axle pin 2 and the second axle pin 3 are mounted with their free ends in bearing holes 13 of the first coupling plate 11 and the adapter plate 12 and in bearing holes 14 of the floor 4 and a second coupling plate 15 which bears against the outer side of the floor 4.

The unlocking slave 5 has a journal-like driver 16 which extends parallel to the first axle pin 2 beyond the clamping eccentric 6 so as to protrude into a driving fork 17 of the catching eccentric 7. In the exemplary embodiment of FIGS. 3 and 4, the arrangement of driver 16 and driver fork 17 is the other way around.

Lying substantially diametrically opposite the driver 16, the unlocking slave 5 has a first tooth sector 18 which is concentric with respect to the first axis 2' and has three teeth 19.

A slave actuating arm 20 of the unlocking slave 5 extends radially at approximately 90 degrees with respect to the first tooth sector 18.

The clamping eccentric 6 has a substantially radially extending spring action arm 21 and, diametrically with respect thereto, a clamping face arm 22 which has a clamping face 23 at its free end.

Extending radially at approximately 90 degrees with respect to the driver fork 17, the catching eccentric 7 has a catching face arm 24 which has a catching face 25 at its free end.

The unlocking element 8 and the unlocking slave 5 are arranged on the first axle pin 2 and the second axle pin 3 so as to lie opposite one another in one plane.

Lying diametrically opposite the first tooth sector 18, a second tooth sector 28 of the unlocking element 8 extends concentrically with respect to the second axis 3', which unlocking element 8 has three teeth 26 which engage into the teeth 19 of the first tooth sector 18.

Extending radially transversely with respect to the second tooth sector 28, the unlocking element 8 has a master actuating arm 29.

The pawl 9 has a hook throat 30 which interacts with a pin 33, as counterelement, which is arranged fixedly, for example, on a floor of a vehicle, and, in the locked state of the locking device, perpendicularly crosses a pin receptacle 31 which is formed in the housing 1. In the open state, the hook throat 30 opens obliquely toward the pin receptacle 31.

The hook throat 30 is delimited at the top by a finger 32 of the pawl 9, the width, defined in this way, of the hook throat 30 being slightly greater than the diameter of the pin 33.

Furthermore, the pawl 9 has a first functional face 34 which, in the locked position, points approximately in the direction of the second axle pin 3. The first functional face 34 is configured, for example, to be concave and curved in a circularly annular manner.

The clamping eccentric 6 and the catching eccentric 7 in each case have a smaller width than the pawl 9 and are both arranged so as to lie opposite the pawl 9.

The clamping eccentric 6 is prestressed toward the pawl 9 by a spring element.

In the locked state, the clamping eccentric 6 exerts a closing moment on the pawl 9 via the clamping face 23 which is curved eccentrically with respect to the first axle pin 2 and is in non-selflocking contact with the first functional face 34. The clamping face 23 is configured, for example, to be convex and curved in a circularly annular manner.

The catching face 25 of the catching eccentric 7 is situated in the vicinity of the clamping face 23, but spaced apart from the first functional face 34 in the locked state. The catching face 25 is configured, for example, to be convex and curved in a circularly annular manner. In the case of a crash when the pawl 9 possibly experiences an opening moment and presses the clamping eccentric 6 away, the catching face 25 comes into contact with the first functional face 34 in order to support the pawl 9 and in order to prevent the latter from opening.

As a result of the movement of the slave actuating arm 20 or the master actuating arm 29 which is coupled to the former via the tooth sectors 18 and 28 by way of an actuating device from the locked state into the unlocked state, the catching eccentric 7 pivots away from the pawl 9. As a result, the catching face 25 moves away from the first functional face 34.

Here, the actuating device has a Bowden cable (not shown) which acts on the master actuating arm 29 via a connecting part 44 which can be fastened to the master actuating arm 29.

Via the driver 16, the catching eccentric 7 drives the clamping eccentric 6 after a small idle stroke. The pawl 9 is then no longer secured.

Here, the pawl 9 is moved suddenly into its unlocked condition by way of a prestressed pawl compression spring 36 which loads the clamping eccentric 6 in the direction of its locked location with its one end and loads the pawl 9 in the unlocking direction with its other end, and, as a result, the pin 33 which is situated in the hook throat 30 and the pin receptacle 31 is ejected out of the hook throat 30 and the pin receptacle 31 by the finger 32.

Here, the pawl is pushed past the clamping eccentric 6 and past the catching eccentric 7 by way of a second functional face 37 which is configured substantially transversely with respect to the first functional face 34.

If the loading in the unlocking direction by slave actuating arm 20 or master actuating arm 29 ends, a prestressed spring element 35 between the clamping eccentric 6 and unlocking element 8 presses the unlocking element 8 and the unlocking slave 5 which is coupled to it in the locking direction.

Here, the clamping eccentric 6 is pressed against the second functional face 37 and bears with a bearing face 39 against the second functional face 37, the surface perpendicular of the second functional face 37 and the bearing face 39 running in front of the center of the second axle pin 2 and the hook throat 30. The clamping eccentric 6 therefore exerts an opening moment on the pawl 9 via the bearing face 39, which opening moment holds said pawl 9 open.

The catching eccentric 7 follows the movement of the clamping eccentric 6. The catching eccentric 7 has a bearing face 40 which is normally at a small spacing from the second functional face 37 in the locked state and comes into contact with the second functional face 37 only in the case of a crash. The surface perpendicular of the bearing face 40 also runs in front of the center of the second axle pin 2 and the hook throat 30.

The pin 33 which is fixed to the vehicle is pressed against the housing 1 of the locking device by way of the closing force of the clamping eccentric 6, which closing force acts on the pawl 9.

When the pin 33 passes again into the pin receptacle 31 and into contact with the finger 32, the pin 33 presses the pawl 9 in the locking direction.

As a result of the arrangement of the pawl compression spring 36 between the pawl 9 and clamping eccentric 6, only comparatively low locking forces are required which act on the pawl 9 when the vehicle-side pin 33 is pivoted in.

Here, the second functional face 37 of the pawl 9 pivots away from the catching eccentric 7 and the clamping eccentric 6. Here, the clamping eccentric 6 is pivoted into its locked condition by way of the spring element 35 and the pawl compression spring 36. Here, the clamping eccentric 6 also loads the driver 16 which likewise pivots the catching eccentric 7 into its locked condition.

It goes without saying that the locking device can be arranged at any point of a vehicle seat and can interact with a counterelement of a vehicle.

Figure 1:
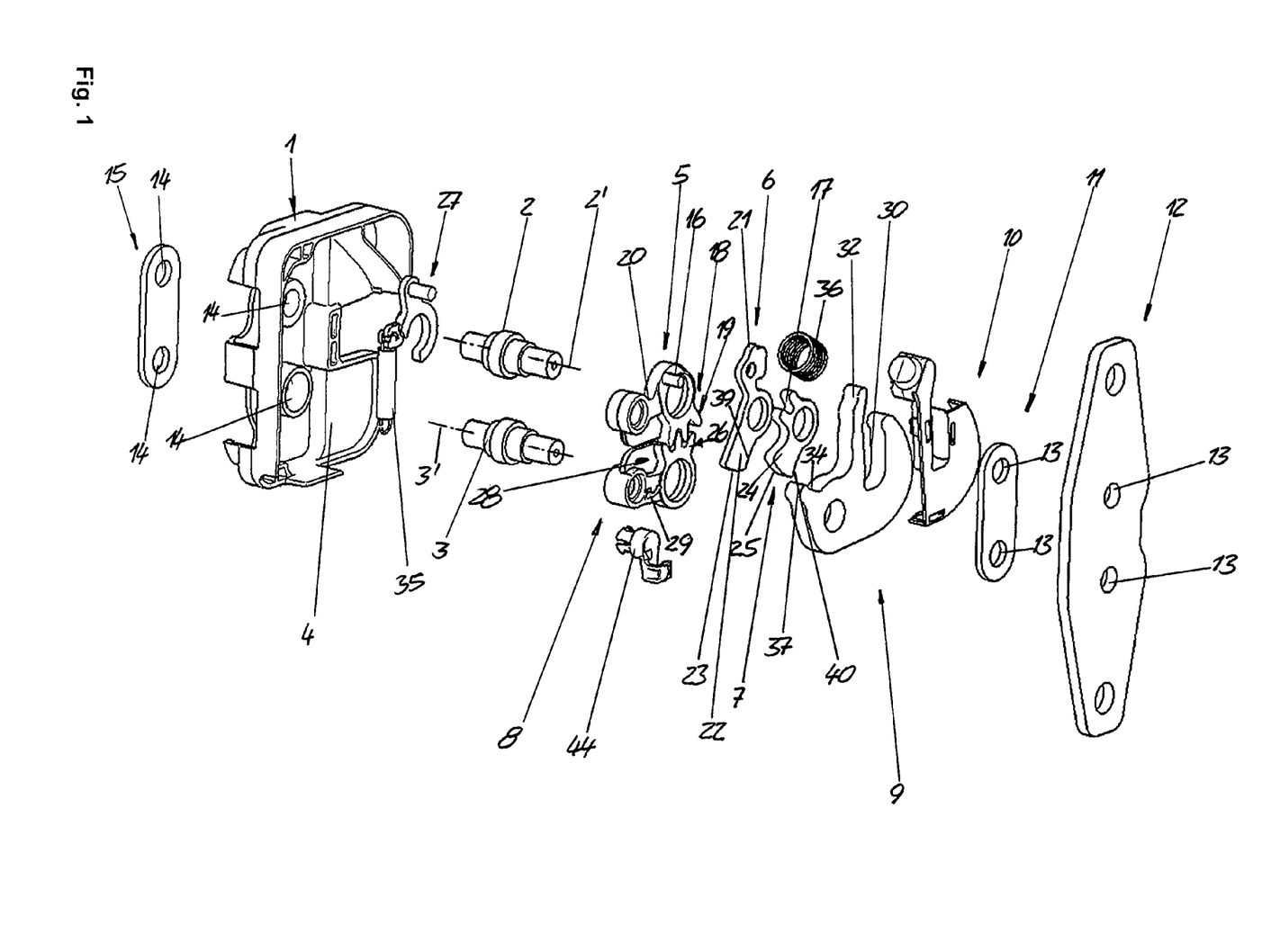
FIG. 1 shows an exploded illustration of a first exemplary embodiment of a locking device.
Figure 2:
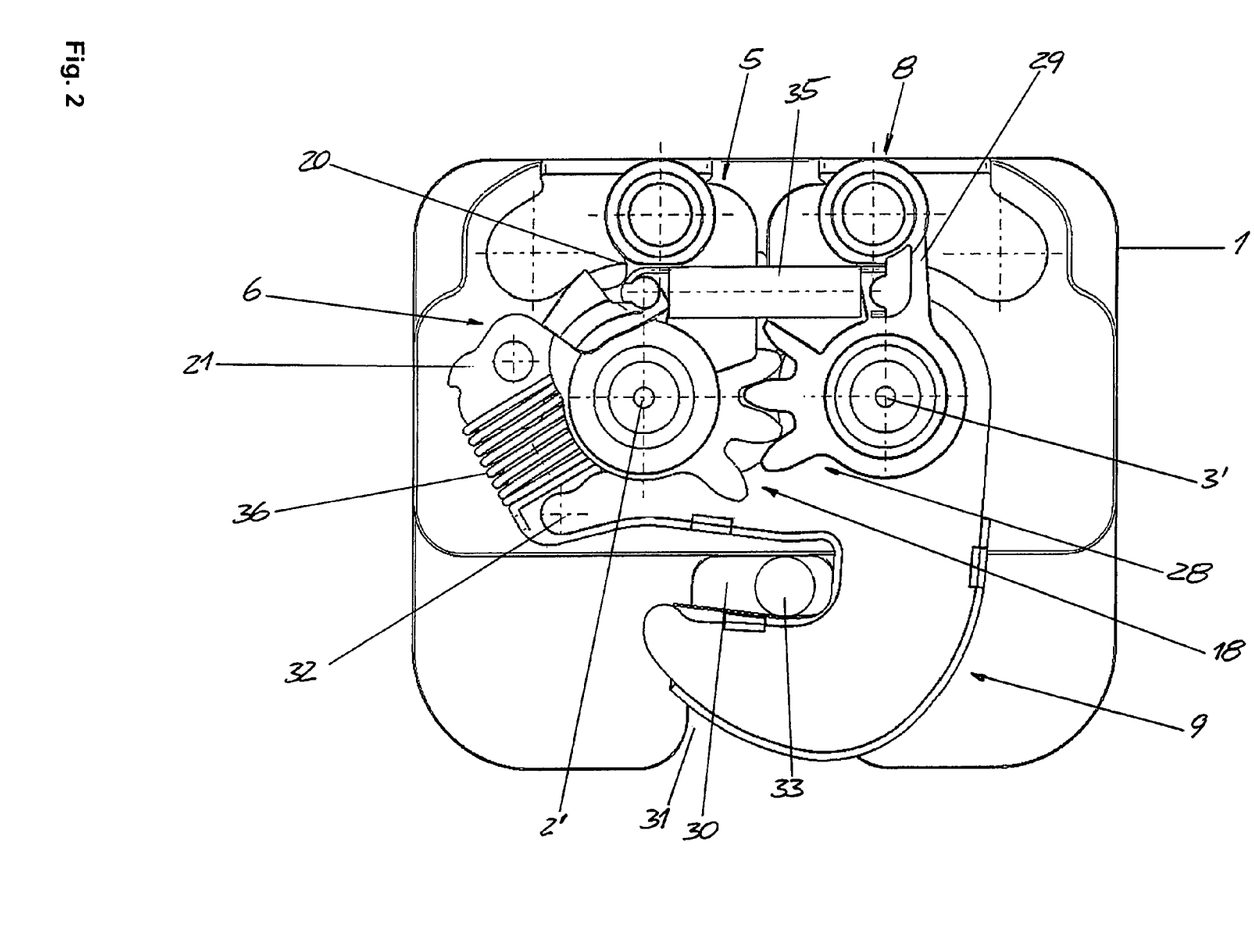
FIG. 2 shows a front-side inner view of the locking device according to FIG. 1 in the locked condition.

In the first exemplary embodiment which is shown in FIGS. 1 and 2, a coupling part 27 is arranged on the clamping eccentric 6 in a positively locking manner, on which coupling part 27 a prestressed tension spring 35 which forms the spring element acts with its one end at a radial spacing from the first axis 2', which tension spring 35 acts with its other end on the unlocking element 8 at a radial spacing from the second axis 3'.

Figure 3:
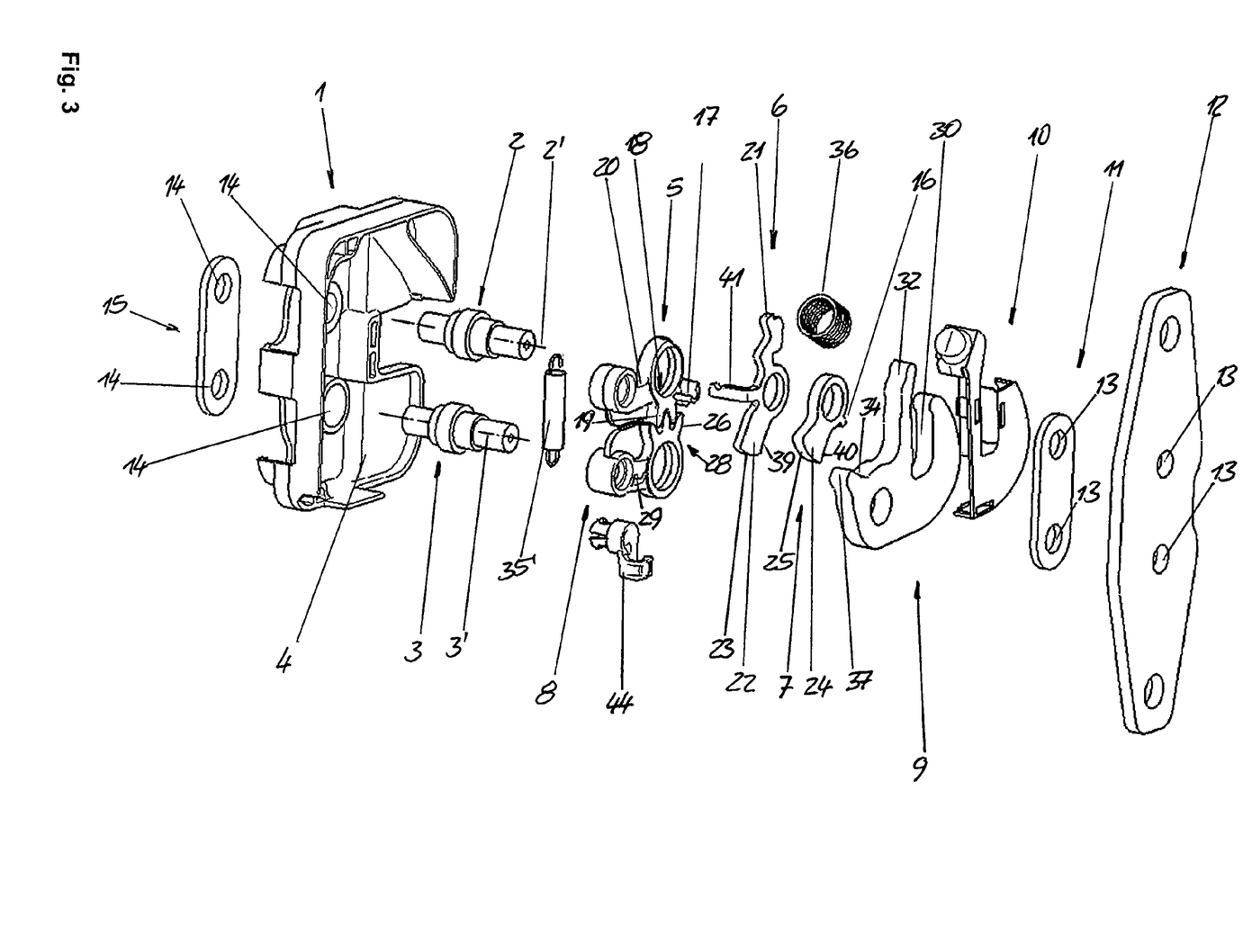
FIG. 3 shows an exploded illustration of a second exemplary embodiment of a locking device.
Figure 4:
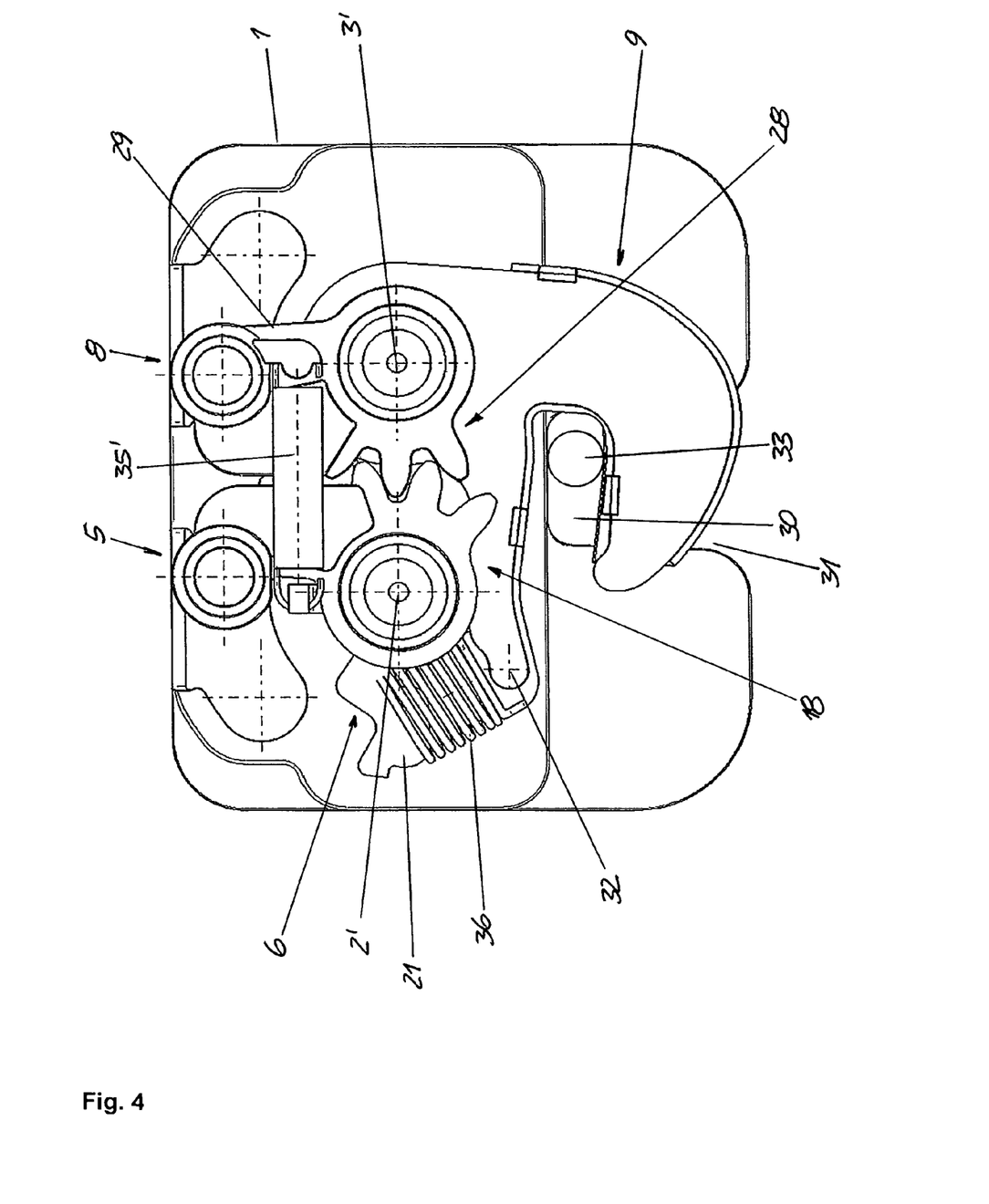
FIG. 4 shows a front-side inner view of the locking device according to FIG. 3 in the locked condition.

In the second exemplary embodiment which is shown in FIGS. 3 and 4, the clamping eccentric 6 has a coupling arm 41 which is configured in one piece with it, extends parallel to the first axis 2', and at the free end of which a prestressed tension spring 35' which forms the spring element acts with its one end, which tension spring 35' acts with its other end on the unlocking element 8 at a radial spacing from the second axis 3'.

Figure 5:
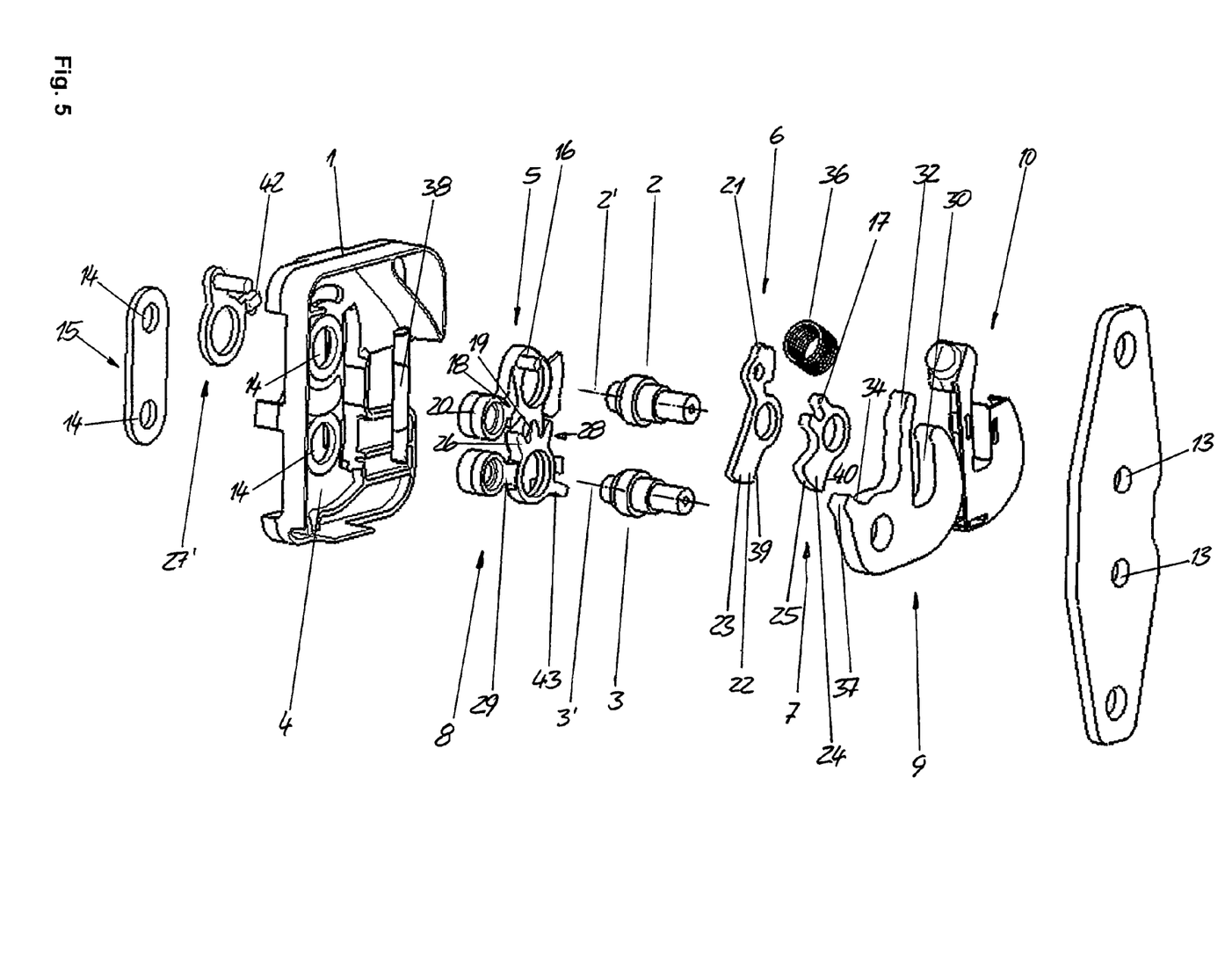
FIG. 5 shows an exploded illustration of a third exemplary embodiment of a locking device.
Figure 6:
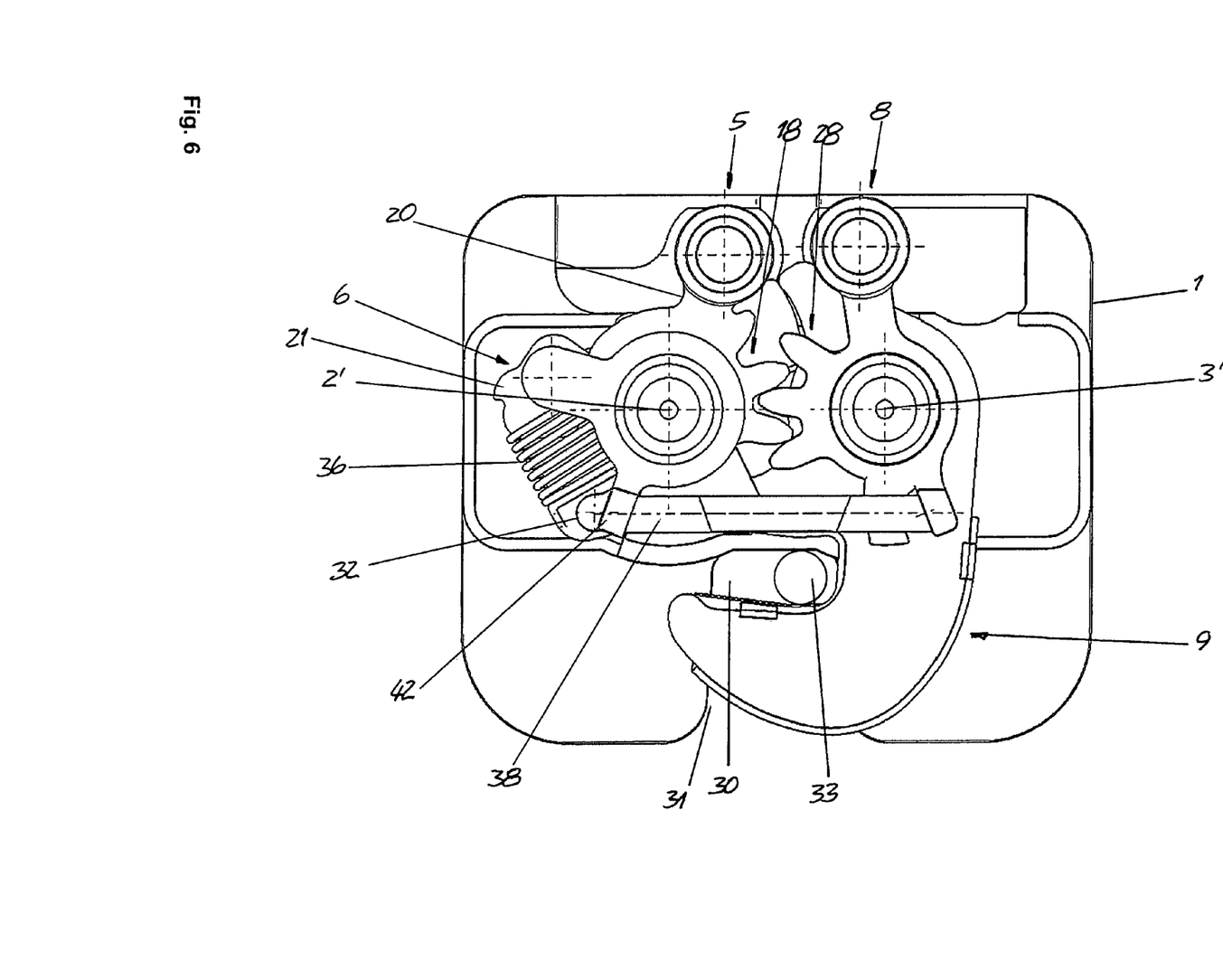
FIG. 6 shows a front-side inner view of the locking device according to FIG. 5 in the locked condition.

In the third exemplary embodiment which is shown in FIGS. 5 and 6, a coupling part 27' is arranged on the clamping eccentric 6 in a positively locking manner, which coupling part 27 has a first spring supporting arm 42, on which a prestressed compression spring 38 which forms the spring element is supported at a radial spacing from the first axis 2', which compression spring 38 is supported with its other end on a second spring supporting arm 43 of the unlocking element 8 at a radial spacing from the second axis 3'.

The features which are disclosed in the above description, the claims and the drawings can be of significance both individually and in combination for the implementation of the invention in its various refinements.

LIST OF DESIGNATIONS

1 Housing
2 First axle pin
2' First axis
3 Second axle pin
3' Second axis
4 Floor
5 Unlocking slave
6 Clamping eccentric
7 Catching eccentric
8 Unlocking element
9 Pawl
10 Cover
11 First coupling plate
12 Adapter plate
13 Bearing holes
14 Bearing holes
15 Second coupling plate
16 Driver
17 Driver fork
18 First tooth sector
19 Teeth
20 Slave actuating arm
21 Spring action arm
22 Clamping face arm
23 Clamping face
24 Catching face arm
25 Catching face
26 Teeth
27 Coupling part
27' Coupling part
28 Second tooth sector 29 Master actuating arm
30 Hook throat
31 Pin receptacle
32 Finger
33 Pin
34 First functional face
35 Tension spring
35' Tension spring
36 Pawl compression spring
37 Second functional face
38 Compression spring
39 Bearing face
40 Bearing face
41 Coupler supporting arm
42 First spring supporting arm
43 Second spring supporting arm
44 Connecting part

The invention claimed is:

1. A locking device for a vehicle seat, comprising:
   a pawl which is mounted such that the pawl can be pivoted about a second axis in order to lock a counterelement;
   a clamping eccentric which is mounted such that the clamping eccentric can be pivoted between a locked location and an unlocked location about a first axis which is parallel to the second axis, wherein the clamping eccentric is configured to secure a locked state of the pawl by interacting with a first functional face of the pawl, wherein a clamping face of the clamping eccentric acts on the first functional face of the pawl in the locked state of the pawl;
   a spring that biases the clamping eccentric toward the locked location;
   an unlocking element mounted such that an actuating device can pivot the unlocking element about the second axis counter to a spring force from a locked condition into an unlocked condition, wherein the unlocking element is configured to drive the clamping eccentric such that the clamping eccentric can be pivoted from its locked location in the direction of its unlocked location; and
   a prestressed spring element that has a first end and a second end, wherein the first end is coupled to the unlocking element and the second end is coupled to the clamping eccentric such that the prestressed spring element is arranged between the unlocking element and the clamping eccentric, wherein the prestressed spring element biases the unlocking element toward its locked condition and biases the clamping eccentric toward its locked location.

2. The locking device as claimed in claim 1, wherein the prestressed spring element is a tension spring which acts with its one end at a radial spacing from the second axis on the unlocking element and acts with its other end at a radial spacing from the first axis on the clamping eccentric.

3. The locking device as claimed in claim 1, wherein the prestressed spring element is a compression spring which acts with its one end at a radial spacing from the second axis on the unlocking element and acts with its other end at a radial spacing from the first axis on the clamping eccentric.

4. The locking device as claimed in claim 1, wherein the spring is a prestressed pawl compression spring that has a first end and a second end, wherein the first end of the prestressed pawl compression spring is supported on an arm of the clamping eccentric so as to bias the clamping eccentric toward its locked location, wherein the second end of the prestressed pawl compression spring biases the pawl toward the unlocking direction.

5. The locking device as claimed in claim 1, wherein a catching eccentric is mounted such that the catching eccentric can be pivoted about the first axis, wherein the catching eccentric is configured to secure the locked state of the pawl by interacting with the first functional face of the pawl, wherein the pawl can be supported in the locked state by a catching face of the catching eccentric, wherein the catching eccentric can be moved between its locked position and its unlocked position directly or indirectly by way of the unlocking element which can be pivoted about the second axis, wherein the catching eccentric and the clamping eccentric are pivotable relative to each other.

6. The locking device as claimed in claim 1, wherein an unlocking slave is mounted such that it can be pivoted about the first axis from a locked condition into an unlocked condition and is coupled via a driving coupling to the unlocking element in such a way that the unlocking slave can be driven such that it can be moved from its locked condition into its unlocked condition by way of a pivoting movement of the unlocking element from the locked condition into the unlocked condition.

7. The locking device as claimed in claim 1, wherein an unlocking slave is mounted such that it can be pivoted about the first axis from a locked condition into an unlocked condition and is coupled via a driving coupling to the unlocking element in such a way that the unlocking slave can be driven such that it can be moved from its unlocked condition into its locked condition by way of a pivoting movement of the unlocking element from the unlocked condition into the locked condition.

8. The locking device as claimed in claim 6, wherein the unlocking slave has a first tooth sector with teeth, and in that the unlocking element has a second tooth sector with teeth which engage into the teeth of the first tooth sector.

9. The locking device as claimed in claim 5, wherein the clamping eccentric is mounted such that it can be pivoted on the first axis between the catching eccentric and the unlocking slave, and the unlocking slave has a driver which extends parallel to the first axis, engages into a driving recess of the catching eccentric, and by way of which the clamping eccentric can be driven pivotably in the direction of its unlocked position.

10. The locking device as claimed in claim 9, wherein the driving recess is a driving fork.

11. A vehicle seat, comprising at least one locking device as claimed in claim 1.

* * * * *